United States Patent
Jeon et al.

(10) Patent No.: US 9,355,149 B2
(45) Date of Patent: May 31, 2016

(54) APPARATUS AND METHOD FOR EFFICIENTLY PROCESSING MULTIPLE CONTINUOUS AGGREGATE QUERIES IN DATA STREAMS

(71) Applicant: Samsung Electronics Co., Ltd., Suwon-si (KR)

(72) Inventors: Joo-Hyuk Jeon, Yongin-si (KR); Seok-Jin Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 13/896,546

(22) Filed: May 17, 2013

(65) Prior Publication Data

US 2014/0012871 A1      Jan. 9, 2014

(30) Foreign Application Priority Data

Jul. 3, 2012   (KR) .................. 10-2012-0072374

(51) Int. Cl.
    *G06F 7/00*    (2006.01)
    *G06F 17/30*   (2006.01)

(52) U.S. Cl.
    CPC .... *G06F 17/30516* (2013.01); *G06F 17/30489* (2013.01)

(58) Field of Classification Search
    USPC ........................................... 707/769
    See application file for complete search history.

(56) References Cited

U.S. PATENT DOCUMENTS

| 2008/0016095 | A1  | 1/2008 | Bhatnagar et al. | |
| 2008/0189575 | A1* | 8/2008 | Miguelanez et al. | 714/25 |
| 2009/0006346 | A1* | 1/2009 | C N et al. | 707/4 |

FOREIGN PATENT DOCUMENTS

| KR | 10-0810257 | 3/2008 |
| KR | 10-0833540 | 5/2008 |
| KR | 10-1133516 | 4/2012 |

OTHER PUBLICATIONS

Li, Jin, et al. "No pane, no gain: efficient evaluation of sliding-window aggregates over data streams." *ACM SIGMOD Record* 34.1 (2005): 39-44.
Krishnamurthy, Sailesh, et al. "On-the-fly sharing for streamed aggregation." *Proceedings of the 2006 ACM SIGMOD International conference on Management of data.* ACM, 2006: 623-634.
Guirguis, Shenoda, et al. "Three-Level Processing of Multiple Aggregates Continuous Queries." *Data Engineering (ICDE), 2012 IEEE 28th International Conference on.* IEEE, 2012:929-940.

* cited by examiner

*Primary Examiner* — Alex Gofman
*Assistant Examiner* — Muluemebet Gurmu
(74) *Attorney, Agent, or Firm* — NSIP Law

(57) ABSTRACT

An apparatus and a method for efficiently processing multiple continuous aggregate queries in data streams are provided. The apparatus includes a first operation result sharing unit configured to generate a common window including first aggregate areas, and store a first operation result of each of the multiple continuous aggregate queries for each of the first aggregate areas. The apparatus further includes a second operation result sharing unit configured to determine a second aggregate area including at least one of the first aggregate areas, and store a second operation result of each of the multiple continuous aggregate queries for the second aggregate area. The apparatus further includes a query processing unit configured to process the multiple continuous aggregate queries based on the first operation result and the second operation result.

16 Claims, 4 Drawing Sheets

APPARATUS AND METHOD FOR EFFICIENTLY PROCESSING MULTIPLE CONTINUOUS AGGREGATE QUERIES IN DATA STREAMS

CROSS-REFERENCE TO RELATED APPLICATION

This application claims the benefit under 35 U.S.C. §119 (a) of Korean Patent Application No. 10-2012-0072374 filed on Jul. 3, 2012, in the Korean Intellectual Property Office, the entire disclosure of which is incorporated herein by reference for all purposes.

BACKGROUND

1. Field

The following description relates to an apparatus and a method for efficiently processing multiple continuous aggregate queries in data streams.

2. Description of the Related Art

The consumption of high speed, unbroken data streams has grown. A technology that processes a data stream is utilized in various ways, including in production and maintenance management, network management systems, stock trading systems, traffic information systems, cloud computing and health care. On top of this, widely-used IP systems and ubiquitous computing environments have further caused an explosion in data usage. Hence, a technology that processes a data stream more efficiently is needed.

While a commonly-used technology that processes data stores the data before processing, a technology that processes a data stream processes the data stream before storage, and thus, requires a new processing technique. In addition, the technology that processes a data stream should use as little memory as possible to provide a quick response during processing of the data stream.

Generally, a concept of a pane is used to process continuous aggregate queries in a data stream. A technique using the concept of the pane includes dividing a window of time by a size of the greatest common divisor between a range and a slice, generating aggregate operation results based on the divided window and sharing the aggregate operation results. This technique yields decent performance in the case of a single overlapping window, but fails to efficiently deal with a plurality of overlapping windows and is not particularly useful in sharing aggregate operation results since the size of a pane is close to 1.

SUMMARY

In one general aspect, there is provided an apparatus configured to process multiple continuous aggregate queries in data streams, the apparatus including a first operation result sharing unit configured to generate a common window including first aggregate areas, and store a first operation result of each of the multiple continuous aggregate queries for each of the first aggregate areas. The apparatus further includes a second operation result sharing unit configured to determine a second aggregate area including at least one of the first aggregate areas, and store a second operation result of each of the multiple continuous aggregate queries for the second aggregate area. The apparatus further includes a query processing unit configured to process the multiple continuous aggregate queries based on the first operation result and the second operation result.

In another general aspect, there is provided a method of processing multiple continuous aggregate queries in data streams, the method including generating a common window including first aggregate areas for the multiple continuous aggregate queries. The method further includes storing a first operation result of each of the multiple continuous aggregate queries for each of the first aggregate areas. The method further includes determining a second aggregate area including at least one of the first aggregate areas. The method further includes storing a second operation result of each of the multiple continuous aggregate queries for the second aggregate area. The method further includes processing the multiple continuous aggregate queries based on the first operation result and the second operation result.

Other features and aspects will be apparent from the following detailed description, the drawings, and the claims.

Figure 1:
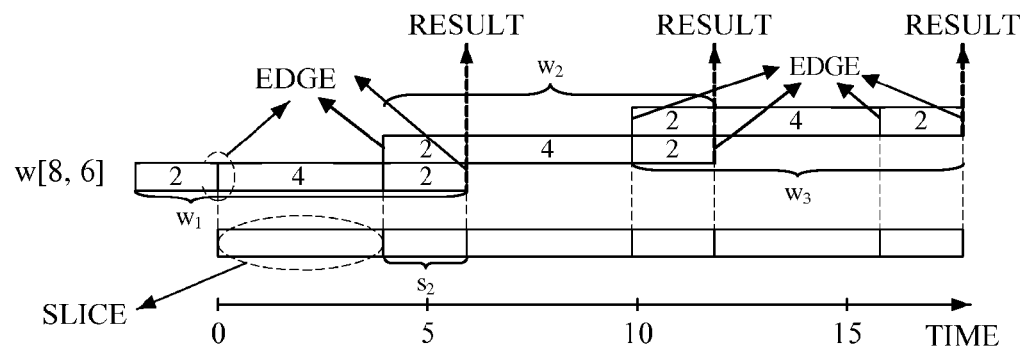
FIG. 1 is a diagram illustrating an example of a continuous aggregate query.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

FIG. 1 is a diagram illustrating an example of a continuous aggregate query. Referring to FIG. 1, the continuous aggregate query is used for continuous acquisition of summary information about a data stream that includes summation (SUM), average (AVG), maximum (MAX), minimum (MIN) and/or count (COUNT). The continuous aggregate query includes an aggregation operator and a sliding window. The aggregation operator is a type of aggregate data, and may include all kinds of algebraic or distributive aggregation operations, such as SUM, AVG, MAX, MIN and/or COUNT. The sliding window is composed of a range and a slide. The range (e.g., of time) is a data area of interest, and the slide is a period (e.g., of time) of collecting a result, that is, an interval (e.g., of time) at which the sliding window moves. An edge of the sliding window is a location connected by two endpoints of the sliding window, and two adjacent edges of two respective sliding windows form one slice.

For example, FIG. 1 illustrates sliding windows $w_1$ to $w_3$ with a range of 8 units of time and a slide of 6 units of time. The sliding windows may be utilized in a user's continuous aggregate query stating, "Please report the average transaction price in the last six minutes at five-minute intervals." The user's continuous aggregate query may be expressed in the example of Table 1 as follows.

TABLE 1

SELECT AVG(T.price)
FROM Trades T [RANGE 8 Minute SLIDE 6 Minute]

A result is collected every slide or 6 units of time. Each of the sliding windows includes two edges, and two adjacent edges of two respective sliding windows form one slice. For example, an edge at endpoints of the sliding window w1 and an edge at beginning points of the sliding window w2 form a slice $s_2$.

A current sliding window may overlap a portion of a previous sliding window when the sliding window is shifted for query processing. Such overlapping happens when a range of the current sliding window is greater than a slide of the current sliding window. For example, since the sliding windows $w_1$ to $w_3$ include the range of 8 units time that is greater than the slide of 6 units of time, the sliding window $w_2$ overlaps a portion of the sliding window $w_1$ when the sliding window $w_1$ is shifted for query processing. Due to the overlapping, a portion of a query that was processed in the previous sliding window needs to be processed again in the current sliding window, and thus, unnecessary operation costs incur.

Further, if a plurality of users needs to acquire summary information about the same data stream, multiple continuous aggregate queries may be used. For example, where a plurality of users needs to collect, from a stock trading system, transaction information about various stock items at different time slots, or where a plurality of system managers needs to collect, from a network management system, traffic information at different time slots, multiple continuous aggregate queries may be used and processed simultaneously in one system.

A method of preventing redundant operations in multiple continuous aggregate queries, and efficiently sharing results of the redundant operations by finding out similarities between the multiple continuous aggregate queries, is described herein. Accordingly, an efficiency in query processing is enhanced.

Figure 2:
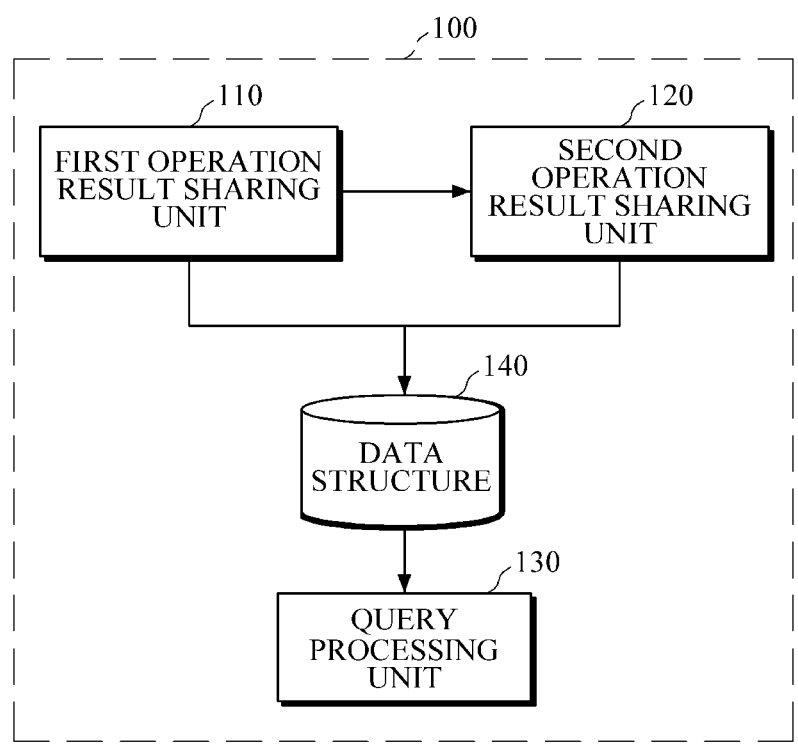
FIG. 2 is a block diagram illustrating an example of an apparatus configured to efficiently process multiple continuous aggregate queries in data streams.

FIG. 2 is a block diagram illustrating an example of an apparatus 100 configured to efficiently process multiple continuous aggregate queries in data streams. Referring to FIG. 2, the apparatus includes a first operation result sharing unit 110, a second operation result sharing unit 120, a query processing unit 130 and a data structure 140.

The first operation result sharing unit 110 generates a common window for the multiple continuous aggregate queries. In this example, each of the multiple continuous aggregate queries includes different sliding windows, but relates to the same type of aggregate data.

Figure 3:
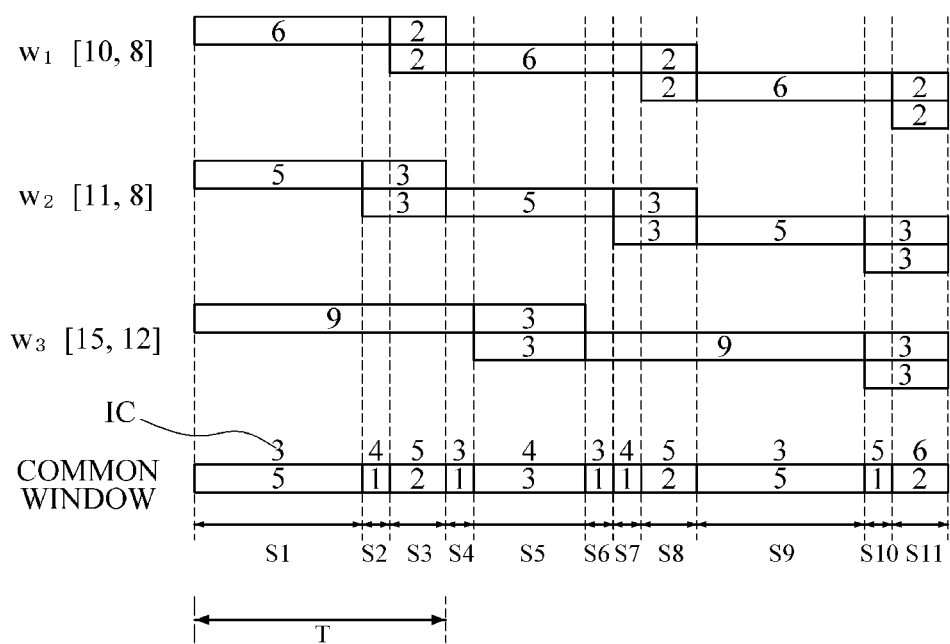
FIG. 3 is a diagram illustrating an example of multiple continuous aggregate queries.

FIG. 3 is a diagram illustrating an example of multiple continuous aggregate queries. Referring to FIG. 3, a common window is generated to include edges of all sliding windows $w_1$, $w_2$ and $w_3$ with respect to the multiple continuous aggregate queries. The common window includes slices S1 to S11 partitioned by the edges. Each of the slices S1 to S11 includes at least one tuple. Each of the slices S1 to S11 includes a number, as illustrated in FIG. 3, which indicates a length of time of a corresponding slice. For example, the slice S1 includes a number 5 indicating a length of time of the slice S1. Referring to FIG. 2, the first operation result sharing unit 110 may generate the common window using an on-the-fly (e.g., real-time) method to thereby minimize memory usage since it is not necessary to store information about every common window in memory.

The first operation result sharing unit 110 determines each first aggregate area of the common window, in which an operation result of each query (e.g., a tuple-level aggregate operation result) is determined and shareable. In other words, the first aggregate area is a unit of an operation result. The unit of the operation result is needed to generate the operation result in advance and share the operation result in order to process the multiple continuous aggregate queries more efficiently. For example, the first aggregate area may be one of the slices S1 to S11 of the common window. As aggregate operations are performed in each of the slices S1 to S11, tuple-level aggregate operation results of the respective slices S1 to S11 are shared when the multiple continuous aggregate queries are processed. The first operation result sharing unit 110 stores the aggregate operation result of each first aggregate area in the data structure 140 to share the aggregate operation result efficiently.

The first operation result sharing unit 110 further calculates an Inclusion Count (IC) of each first aggregate area, and stores the calculated IC in the data structure 140. The IC is a number of the sliding windows corresponding to (e.g., active in) a respective first aggregate area (for example, a slice) of the common window. For example, a number of sliding windows corresponding to the slice S1 is 3 since the sliding windows corresponding to the slice S1 do not overlap each other. On the other hand, a number of windows corresponding to the slice S2 is 4 since the sliding windows $w_2$ corresponding to the slice S2 overlap each other. ICs calculated in the above manner are illustrated in FIG. 3.

The second operation result sharing unit 120 determines each second aggregate area, including at least one first aggregate area, of the common window. In each second aggregate area, an operation result of each query (e.g., a slice-level aggregate operation result) is determined and shareable. In other words, the second aggregate area is the largest aggregate area in which the aggregate operation result of the multiple continuous aggregate queries are determined and shareable. Since the slice-level aggregate operation result is shareable, more efficiency in processing the multiple continuous aggregate queries may be achieved. The second operation result sharing unit 120 may generate each second aggregate area using the on-the-fly method to thereby minimize memory usage since it is not necessary to store information about each second aggregate area in memory.

The second operation result sharing unit 120 determines each second aggregate area based on the calculated IC. The second operation result sharing unit 120 may determine each second aggregate area further based on a user-set arbitrary number and a number of the queries, besides the IC. That is, during a pre-processing, a user may set the arbitrary number necessary to determine the second aggregate area.

For example, the second aggregate area T is illustrated in FIG. 3. Where the user-set arbitrary number is $\alpha$ and the number of the queries is n, the second aggregate area T is a group of slices shared by ($\alpha \times n$) sliding windows among all slices and that each include the IC greater than or equal to a value of ($\alpha \times n$). If the user-set arbitrary number a is 1 and the number of the queries is 3, the value of ($\alpha \times n$) is 3. Considering this value of ($\alpha \times n$), the slices S1, S2 and S3 are shared by 3 initial sliding windows, and include the ICs of 3, 4 and 5, respectively, each of which being greater than or equal to 3. Therefore, the second aggregate area T includes a group of the slices S1, S2 and S3. However, the slice S4 is not shared by all of the 3 initial sliding windows, namely, the initial sliding window of the sliding windows $w_2$. Accordingly, the second aggregate area T does not include the slice S4.

The second operation result sharing unit 120 stores the aggregate operation result of each second aggregate area in the data structure 140. Due to such a configuration, the tuple-level aggregate operation results and slice-level aggregate operation results are shareable, thereby enhancing efficiency in query processing.

The query processing unit 130 shares the aggregate operation results of the first and second aggregate areas that are stored in the data structure 140. The query processing unit 130 further processes the multiple continuous aggregate queries based on the aggregate operation results of the first and second aggregate areas.

The data structure 140 may be a linked list, a priority queue, a tree structure, a multi-dimensional structure and/or any other data structure known to one of ordinary skill in the art. The data structure 140 may include a plurality of nodes, and each of the nodes may correspond to either a first aggregate area or a second aggregate area. Each of the nodes may include an IC, a time slot and/or a portion of information about the aggregate operation results. In addition, a node corresponding to a second aggregate area may include link information of a first aggregate area included in the second aggregate area.

While processing the multiple continuous aggregate queries, the query processing unit 130 reduces an IC of a first aggregate area in which an aggregate operation result is shared in the data structure 140, by one. In addition, the query processing unit 130 deletes, from the data structure 140, a node corresponding to a first aggregate area of which an IC has reduced to 0 due to the above method. An IC of a first aggregate area that is reduced to 0 means that the first aggregate area is no longer corresponding to any sliding window, so that an aggregate operation result of the first aggregate area is no longer shared. Accordingly, information about the first aggregate area is deleted from the data structure 140, and thus, memory space of the data structure 140 is optimized.

Figure 4:
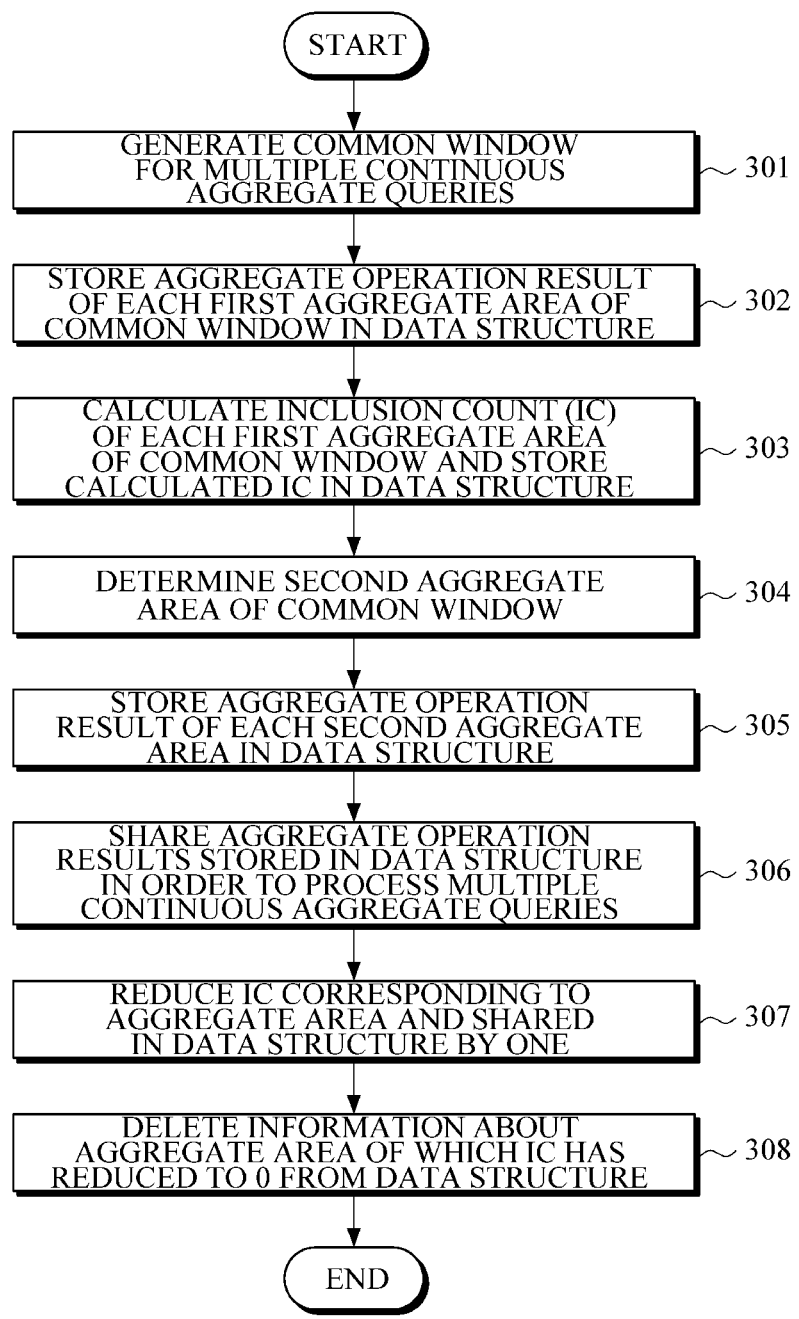
FIG. 4 is a flowchart illustrating an example of a method of efficiently processing multiple continuous aggregate queries in data streams.

FIG. 4 is a flowchart illustrating an example of a method of efficiently processing multiple continuous aggregate queries in data streams. In operation 301, the apparatus 100 of FIG. 2 configured to process the multiple continuous aggregate queries generates a common window for the multiple continuous aggregate queries. The common window is generated to include all edges of each sliding window for the multiple continuous aggregate queries, and includes slices partitioned by the edges.

In operation 302, the apparatus 100 determines each first aggregate area of the common window, in which an operation result of each query (e.g., a tuple-level aggregate operation result) is determined and shareable. The apparatus stores the aggregate operation result of each first aggregate area of the common window in the data structure 140. Each first aggregate area may be each respective slice of the common window, and the aggregate operation result may be stored on a slice basis.

In operation 303, the apparatus 100 calculates an IC of each first aggregate area of the common window, and stores the calculated IC in the data structure 140. The IC is a number of the sliding windows corresponding to (e.g., active in) a respective first aggregate area of the common window.

In operation 304, the apparatus 100 determines each second aggregate area, including at least one first aggregate area, of the common window. In each second aggregate area, an operation result of each query (e.g., a slice-level aggregate operation result) is determined and shareable. In other words, the second aggregate area is the largest aggregate area in which the aggregate operation result of the multiple continuous aggregate queries are determined and shareable. Since the slice-level aggregate operation result is shareable, the multiple continuous aggregate queries may be processed more efficiently. Each second aggregate area may be generated using the on-the-fly method, and thus, it is not necessary to store information about every second aggregate area in memory. Accordingly, memory usage may be minimized, and in turn, query processing may become more efficient. Each second aggregate area may be determined based on the calculated ICS, a user-set arbitrary number and/or a number of the queries.

In operation 305, the apparatus 100 stores the aggregation operation result of each second aggregate area in the data structure 140.

In operation 306, the apparatus 100 shares the aggregate operation results of the first and second aggregate areas that are stored in the data structure 140 in order to process the multiple continuous aggregate queries. That is, tuple-level aggregation operation results and slice-level aggregation operation results of the first and second aggregate areas, respectively, are shared when the multiple continuous aggregated queries are processed, thereby enhancing efficiency in the query processing.

In operation 307, while processing the multiple continuous aggregate queries, the query processing unit 130 reduces an IC corresponding to a first aggregate area in which an aggregate operation result is shared in the data structure 140, by one. In operation 308, the query processing unit 130 deletes, from the data structure 140, information about a first aggregate area of which an IC has reduced to 0 due to the operation 307. An IC of a first aggregate area that is reduced to 0 means that the first aggregate area is no longer corresponding to any sliding window, so that an aggregation operation result of the first aggregate area is no longer shared. Accordingly, information about the first aggregate area is deleted from the data structure 140, and in turn, memory space becomes optimized, thereby preventing delay in the query processing.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, that independently or collectively instructs or configures the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to process multiple continuous aggregate queries in data streams, the apparatus comprising:
   a first operation result sharing unit configured to generate a common window comprising first aggregate areas, store a first operation result of each of the multiple continuous aggregate queries for each of the first aggregate areas, and calculate an inclusion count (IC) of each of the first aggregate areas;
   a second operation result sharing unit configured to determine a second aggregate area comprising at least one of the first aggregate areas, and store a second operation result of each of the multiple continuous aggregate queries for the second aggregate area; and
   a query processing unit configured to process the multiple continuous aggregate queries based on the first operation result and the second operation result;
   wherein the IC is a number of the sliding windows corresponding to a respective first aggregate area of the common window,
   wherein the common window comprises edges of each sliding window for the multiple continuous aggregate queries and each of the first aggregate areas is partitioned by two adjacent edges of the edges, and
   wherein the multiple continuous aggregate queries comprise different sliding windows, and a same type of an aggregate operation.

2. The apparatus of claim 1, wherein the aggregate operation comprises an algebraic aggregate operation and/or a distributive aggregate operation.

3. The apparatus of claim 1, wherein the aggregate operation comprises a summation, or an average, or a maximum, or a minimum, or a count, or any combination thereof.

4. The apparatus of claim 1, wherein:
   the second operation result sharing unit is further configured to determine the second aggregate area based on the IC.

5. The apparatus of claim 4, wherein the IC of each of the first aggregate areas comprises a number of sliding windows for the multiple continuous aggregate queries that correspond to a respective one of the first aggregate areas.

6. The apparatus of claim 4, wherein the query processing unit is further configured to:
   reduce, by one, the IC of one of the first aggregate areas in which the first operation result is used to process the multiple continuous aggregate queries; and
   delete information about the one of the first aggregate areas if the respective IC is reduced to 0.

7. The apparatus of claim 4, wherein the second operation result sharing unit is further configured to determine the second aggregate area further based on a predetermined number and a number of the multiple continuous aggregate queries.

8. The apparatus of claim 1, wherein the first operation result for each of the first aggregate areas and the second operation result for the second aggregate area are stored in a data structure comprising a linked list, or a priority queue, or a tree structure, or a multi-dimensional structure, or any combination thereof.

9. A method of processing multiple continuous aggregate queries in data streams, the method comprising:
   generating a common window comprising first aggregate areas for the multiple continuous aggregate queries;
   storing a first operation result of each of the multiple continuous aggregate queries for each of the first aggregate areas;
   calculating an inclusion count (IC) of each of the first aggregate areas;
   determining a second aggregate area comprising at least one of the first aggregate areas;
   storing a second operation result of each of the multiple continuous aggregate queries for the second aggregate area; and
   processing the multiple continuous aggregate queries based on the first operation result and the second operation result;
   wherein the IC is a number of the sliding windows corresponding to a respective first aggregate area of the common window,
   wherein the common window comprises edges of each sliding window for the multiple continuous aggregate queries, and each of the first aggregate areas is partitioned by two adjacent edges of the edges, and
   wherein the multiple continuous aggregate queries comprise different sliding windows, and a same type of an aggregate operation.

10. The method of claim 9, wherein the aggregate operation comprises an algebraic aggregate operation and/or a distributive aggregate operation.

11. The method of claim 9, wherein the aggregate operation comprises a summation, or an average, or a maximum, or a minimum, or a count, or any combination thereof.

12. The method of claim 9, further comprising:
   determining the second aggregate area based on the IC.

13. The method of claim 12, wherein the IC of each of the first aggregate areas comprises a number of sliding windows for the multiple continuous aggregate queries that correspond to a respective one of the first aggregate areas.

14. The method of claim 12, further comprising:
   reducing, by one, the IC of one of the first aggregate areas in which the first operation result is used to process the multiple continuous aggregate queries; and
   deleting information about the one of the first aggregate areas if the respective IC is reduced to 0.

15. The method of claim 12, further comprising determining the second aggregate area further based on a predetermined number and a number of the multiple continuous aggregate queries.

16. The method of claim 9, wherein the first operation result for each of the first aggregate areas and the second operation result for the second aggregate area are stored in a data structure comprising a linked list, or a priority queue, or a tree structure, or a multi-dimensional structure, or any combination thereof.

* * * * *